US008910242B2

(12) United States Patent
Komiyama

(10) Patent No.: US 8,910,242 B2
(45) Date of Patent: Dec. 9, 2014

(54) ENABLE/DISABLE METHOD OF ADDITIONAL-FUNCTION UNIT, SYSTEM FOR SAME, PROGRAM FOR SAME, AS WELL AS ADDITIONAL-FUNCTION UNIT

(75) Inventor: Tsuyoshi Komiyama, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/982,646

(22) PCT Filed: Sep. 12, 2011

(86) PCT No.: PCT/JP2011/070723
§ 371 (c)(1),
(2), (4) Date: Sep. 4, 2013

(87) PCT Pub. No.: WO2012/111189
PCT Pub. Date: Aug. 23, 2012

(65) Prior Publication Data
US 2013/0340038 A1    Dec. 19, 2013

(30) Foreign Application Priority Data

Feb. 16, 2011  (JP) .................. 2011-030746

(51) Int. Cl.
*H04L 29/00* (2006.01)
*G06F 21/51* (2013.01)
*G06F 21/44* (2013.01)

(52) U.S. Cl.
CPC .............. *G06F 21/44* (2013.01); *G06F 21/51* (2013.01)
USPC ............... 726/2; 726/3; 726/4; 726/5; 726/6; 726/7; 726/8; 726/9

(58) Field of Classification Search
USPC ......................................... 726/2–9
See application file for complete search history.

(56) References Cited

U.S. PATENT DOCUMENTS

| 6,850,996 B2 * | 2/2005 | Wagner ........................... 710/33 |
| 2009/0177582 A1 * | 7/2009 | Cucinotta ....................... 705/44 |

FOREIGN PATENT DOCUMENTS

| JP | 62-275784 A | 11/1987 |
| JP | 2002-109439 A | 4/2002 |

(Continued)

OTHER PUBLICATIONS

International Search Report for PCT Application No. PCT/JP2011/070723 mailed on Oct. 11, 2011.

*Primary Examiner* — Ghazal Shehni
(74) *Attorney, Agent, or Firm* — Sughrue Mion, PLLC

(57) ABSTRACT

The objective of the present invention is to disable functionality of an additional-function unit if an unauthorized program has been installed in an information processing device, thereby preventing an unauthorized program from acquiring, in an unauthorized manner, information from the additional-function unit. The present invention is an enable/disable method for an additional-function unit in an information processing device to which the additional-function unit has been added, which has a step for calculating a first directional function value on the basis of data included in a recording medium storing a boot loader and an operating system so as to store the first directional function value at manufacture time into the additional-function unit, a step for calculating a second directional function value on the basis of data included in the recording medium after the information processing device has been started up, and a step for disabling the functionality of the additional-function unit if the first directional function value and the second directional function value are different.

20 Claims, 4 Drawing Sheets

(56) References Cited

FOREIGN PATENT DOCUMENTS

| | | |
|---|---|---|
| JP | 2002-258963 A | 9/2002 |
| JP | 2002-352165 A | 12/2002 |
| JP | 2004-199269 A | 7/2004 |
| JP | 2005-293058 A | 10/2005 |
| JP | 2006-247192 A | 9/2006 |
| JP | 2007-310688 A | 11/2007 |
| JP | 2008-009681 A | 1/2008 |
| JP | 2008-077256 A | 4/2008 |
| JP | 2008-139910 A | 6/2008 |
| JP | 2008-282112 A | 11/2008 |
| JP | 2009-117887 A | 5/2009 |

* cited by examiner

ENABLE/DISABLE METHOD OF ADDITIONAL-FUNCTION UNIT, SYSTEM FOR SAME, PROGRAM FOR SAME, AS WELL AS ADDITIONAL-FUNCTION UNIT

This application is a National Stage Entry of PCT/JP2011/070723 filed Sep. 12, 2011, which claims priority from Japanese Patent Application 2011-030746 filed Feb. 16, 2011, the contents of all of which are incorporated herein by reference, in their entirety.

TECHNICAL FIELD

The present invention relates to a method of validating/invalidating an additional function unit in an information processing apparatus to which the additional function unit is added, a system thereof and a program thereof and, more particularly, relates to a method of validating/invalidating a PIN (Personal Identification Number) input unit in a handy terminal as an information processing apparatus to which a PIN input unit as an additional function unit is added, a system thereof and a program thereof.

BACKGROUND ART

An international uniform standard related to security of a payment card is standardized targeting at a terminal apparatus for inputting a PIN of a credit card. Although it is possible to prevent a PIN code from being stolen by providing a PIN input dedicated keyboard and a display apparatus, using the PIN input dedicated machine makes it necessary to bring two apparatuses of the PIN input dedicated machine and a handy terminal, and undermines portability. Further, mounting two of the keyboard and the display apparatus in one apparatus increases manufacturing cost and limits use.

JP-A-2009-117887 (Patent Literature 1) discloses a network system which records a certificate on a client side and performs authentication processing between a client and a server.

JP-A-62-275784 (Patent Literature 2) discloses a technique of adding a received electronic money legitimacy checking function and a stored electronic money falsification preventing function in a memory which stores electronic money.

JP-A-2008-282112 (Patent Literature 3) discloses an invention which authenticates a person in charge of a payment operation.

JP-A-2002-258963 (Patent Literature 4) discloses an invention a feature of which lies in a method of displaying a warning message when unauthorized copy occurs.

JP-A-2002-109439 (Patent Literature 5) discloses an invention which prevents unauthorized payment processing using a password or biometric information.

JP-A-2008-139910 (Patent Literature 6) discloses a system which authenticates a user who performs a payment operation by means of a mobile telephone.

JP-A-2008-009681 (Patent Literature 7) discloses a system which authenticates a person in charge of operating a mobile terminal which can perform payment.

JP-A-2008-077256 (Patent Literature 8) discloses a system which authenticates a user to prevent unauthorized use of an electronic money function.

JP-A-2006-247192 (Patent Literature 9) discloses a payment system which uses a server to authenticate a user.

JP-A-2002-352165 (Patent Literature 10) discloses an invention which performs authentication based on position information of a user.

JP-A-2004-199269 (Patent Literature 11) discloses an invention which authenticates a user based on a telephone number and personal information registered in advance.

CITATION LIST

Patent Literature

{PTL 1} JP-A-2009-117887
{PTL 2} JP-A-62-275784
{PTL 3} JP-A-2008-282112
{PTL 4} JP-A-2002-258963
{PTL 5} JP-A-2002-109439
{PTL 6} JP-A-2008-139910
{PTL 7} JP-A-2008-009681
{PTL 8} JP-A-2008-077256
{PTL 9} JP-A-2006-247192
{PTL 10} JP-A-2002-352165
{PTL 11} JP-A-2004-199269

SUMMARY OF INVENTION

Technical Problem

To input a PIN of a credit card, a PIN input dedicated keyboard which is different from a keyboard used for an application program is used. As to display, a display apparatus which is used to input a PIN is separated from an application program to prevent a PIN code from being stolen.

If the keyboard and the display apparatus which are used for the application program can be shared to input a PIN, it is possible to miniaturize a handy terminal and, consequently, improve portability, simplify structure design and manufacturing process, reduce manufacturing cost and improve user-friendliness.

However, when the keyboard and the display apparatus are shared, an unauthorized program is installed, a fake input screen for inputting a PIN is created and therefore a PIN code is stolen.

The invention disclosed in Patent Literature 1 is vulnerable when an unauthorized program which performs authentication processing is installed.

The inventions according to Patent Literatures 2 to 11 do not authenticate validity of a program code itself.

An object of the present invention is to provide a method of validating/invalidating an additional function unit, a system thereof and a program thereof which, when an unauthorized program is installed in an information processing apparatus, prevent the unauthorized program from improperly obtaining information from the additional function unit by invalidating a function of the additional function unit.

Solution to Problem

According to a first aspect of the present invention, a method of validating/invalidating an additional function unit in an information processing apparatus to which the additional function unit is added, includes: a step of calculating a first one-way function value based on data included in a recording medium that stores a boot loader and an operating system, and storing the first one-way function value in the additional function unit upon manufacturing; a step of calculating a second one-way function value based on the data included in the recording medium after the information processing apparatus is activated; and a step of, when the first one-way function value and the second one-way function value are different, invalidating a function of the additional function unit.

Further, according to the second aspect of the present invention, a system that validates/invalidates an additional function unit in an information processing apparatus to which the additional function unit is added, has: a means that calculates a first one-way function value based on data included in a recording medium that stores a boot loader and an operating system, and stores the first one-way function value in the additional function unit upon manufacturing; a means that calculates a second one-way function value based on the data included in the recording medium after the information processing apparatus is activated; and a means that, when the first one-way function value and the second one-way function value are different, invalidates a function of the additional function unit.

Furthermore, according to the third aspect of the present invention, a program that causes a computer to function as a system that validates/invalidates an additional function unit in an information processing apparatus to which the additional function unit is added, causes the computer to function as: a means that calculates a first one-way function value based on data included in a recording medium that stores a boot loader and an operating system, and stores the first one-way function value in the additional function unit upon manufacturing; a means that calculates a second one-way function value based on the data included in the recording medium after the information processing apparatus is activated; and a means that, when the first one-way function value and the second one-way function value are different, invalidates a function of the additional function unit.

Still further, according to the fourth aspect of the present invention, an additional function unit that is added to an information processing apparatus, has: a means that stores upon manufacturing a first one-way function value calculated based on data included in a recording medium that stores a boot loader and an operating system; and a means that, when a second one-way function value calculated based on the data included in the recording medium after the information processing apparatus is activated, and the first one-way function value are different, invalidates a function of the additional function unit.

Moreover, according to the fifth aspect of the present invention, a program that causes a computer to function as an apparatus that validates/invalidates an additional function unit that is added to the information processing apparatus, causes the computer to function as: a means that stores upon manufacturing a first one-way function value calculated based on data included in a recording medium that stores a boot loader and an operating system; and a means that, when a second one-way function value calculated based on the data included in the recording medium after the information processing apparatus is activated, and the first one-way function value are different, invalidates a function of the additional function unit.

Advantageous Effects of the Invention

According to the present invention, when an unauthorized program is installed in an information processing apparatus, it is possible to prevent the unauthorized program from improperly obtaining information from an additional function unit by invalidating a function of the additional function unit.

DESCRIPTION OF EMBODIMENTS

Hereinafter, an embodiment for implementing the present invention will be described in details with reference to the drawings.

In the present embodiment, in a payment function mounted handy terminal which can execute input and display of a PIN of a credit card and input and display of an application program operation processing by means of a common keyboard and display apparatus, a PIN input unit has a function of authenticating a boot loader, an OS (Operating System) and an application program of a main unit.

In a memory of the PIN input unit which can perform PIN input processing of a credit card, authentication information of the boot loader, the OS and the application program executed by the main unit is registered.

Based on the authentication information, the PIN input unit performs processing of authenticating whether or not the boot loader, the OS and the application program to be executed by the main unit are authorized programs and, when it is checked that the boot loader, the OS and the application program executed by the main unit are authorized, the function of the PIN input unit is validated. When impropriety is found by the authentication processing, the function of the PIN input unit is invalidated.

By this means, when an unauthorized boot loader, OS and application program which are targeted at stealing a PIN code are found, the function of the PIN input unit is invalidated and a key code notifying function also stops, so that key input cannot be executed and it is possible to prevent the PIN code from being stolen. Meanwhile, invalidating the function of the PIN input unit includes at least inputting a PIN code and invalidating a function of transmitting the PIN code to the main unit. Further, invalidating the function of the PIN input unit may include reading data from a contact IC card or a non-contact IC card, and invalidating the function of transmitting this data to the main unit.

A configuration of a payment function mounted handy terminal will be described with reference to FIG. 1.

Figure 1:
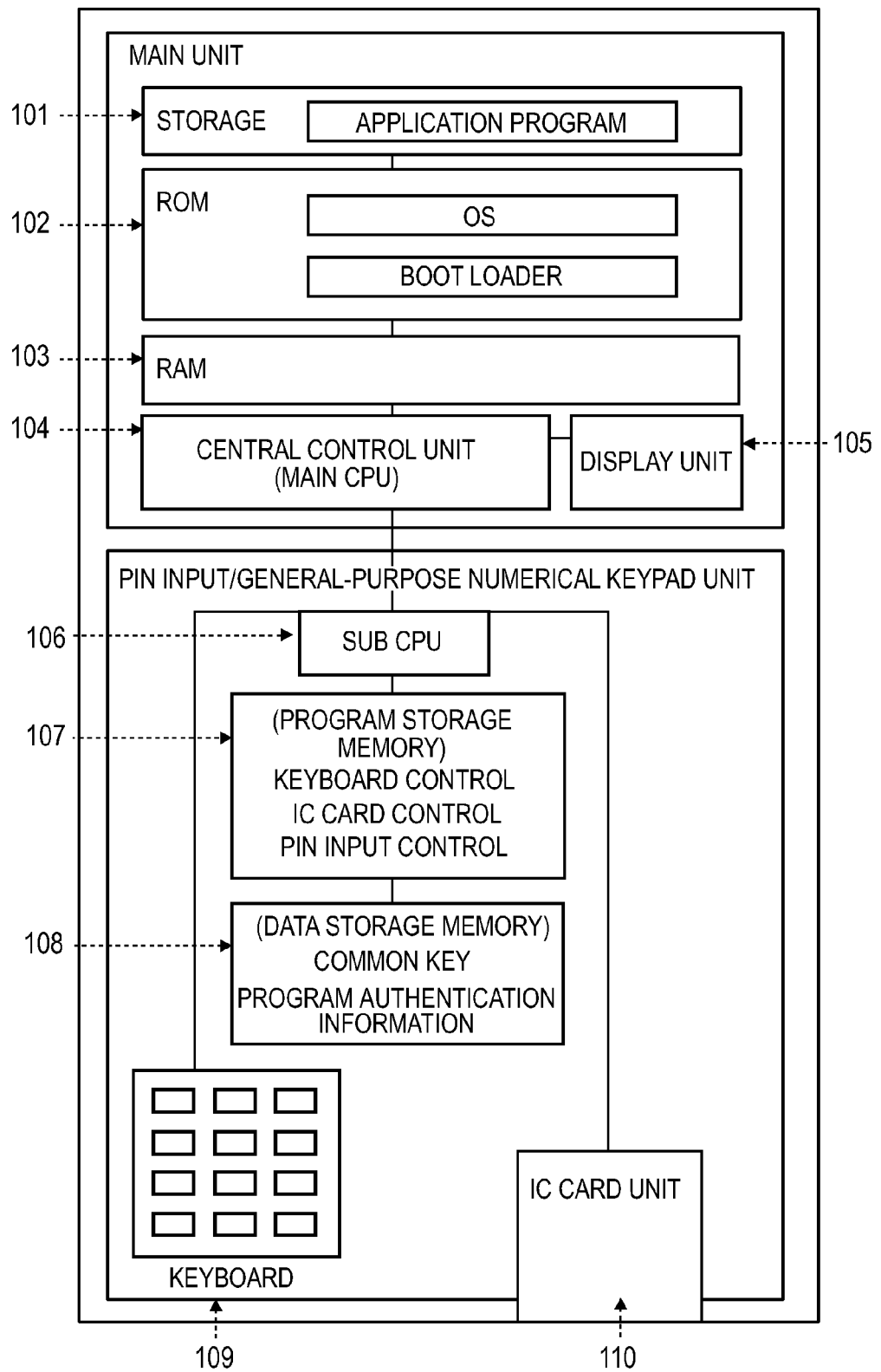
FIG. 1 A figure illustrates a block diagram of a handy terminal which has a built-in PIN input unit according to an embodiment of the present invention.

Referring to FIG. 1, the payment function mounted handy terminal according to the embodiment of the present invention has a main unit and a PIN input/general-purpose numerical keypad. The main unit has a storage 101, a ROM (Read Only Memory) 102, a RAM (Random Access Memory) 103, a central control unit (main CPU (Central Processing Unit)) 104 and a display unit 105. The PIN input/general-purpose numerical keypad includes a sub CPU 106, a program storage memory 107, a data storage memory 108, a keyboard 109 and an IC card unit 110.

The storage 101 is a memory which stores an application program. The ROM 102 is a memory which stores the boot loader and the OS. The RAM 103 is a memory which stores execution programs of a first kind. Meanwhile, the execution programs of the first kind refer to programs to be executed by the central control unit 104 among the boot loader, the OS and the application program. The central control unit (main CPU) 104 executes the execution programs of the first kind. The display unit 105 displays the screen. The sub CPU 106 controls the PIN input/general-purpose numerical keypad unit. The program storage memory 107 is a memory which stores execution programs of a second kind to be executed by the sub CPU 106. Meanwhile, the execution programs of the second kind are a keyboard control program, an IC card control program and a PIN input control program. The data storage memory 108 stores a program authentication information table and an encryption key (for example, a common key of a common key system). The keyboard 109 inputs a PIN. The IC card unit 110 reads information from an inserted contact IC card (for example, a credit and) or a non-contact IC card which is passed.

Next, a method of authenticating the boot loader, the OS and the application program implemented in the main unit will be described with reference mainly to FIGS. 2, 3, 4 and 5.

Figure 2:
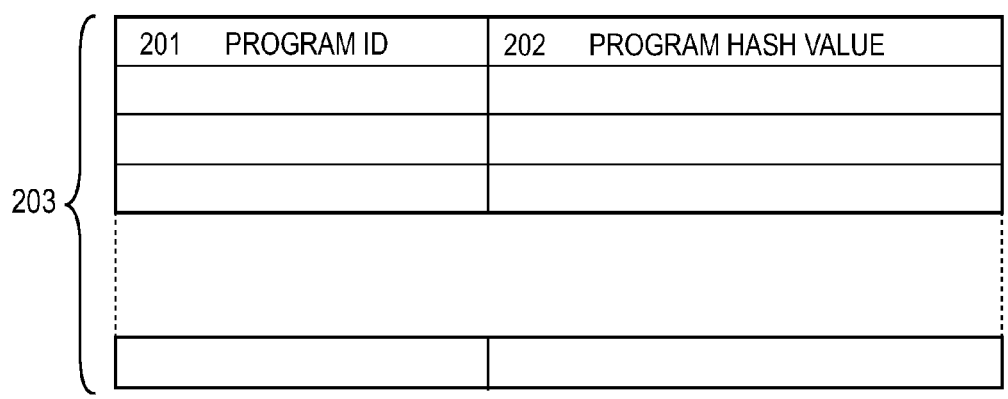
FIG. 2 A figure illustrates a configuration diagram of a program authentication information table according to the embodiment of the present invention.

A configuration of the program authentication information table will be described with reference to FIG. 2. The program authentication information table is stored in the data storage memory 108.

The program authentication information table includes one or more records 203, and each record is associated with one program. Meanwhile, the programs refer to the boot loader, the OS and the application program. Each record includes a field 201 of a program ID and a hash value of a program. The program ID is, for example, a name of a program. The hash value of the program is a value obtained by applying a predetermined hash function to entire image data of a program file.

Figure 3:
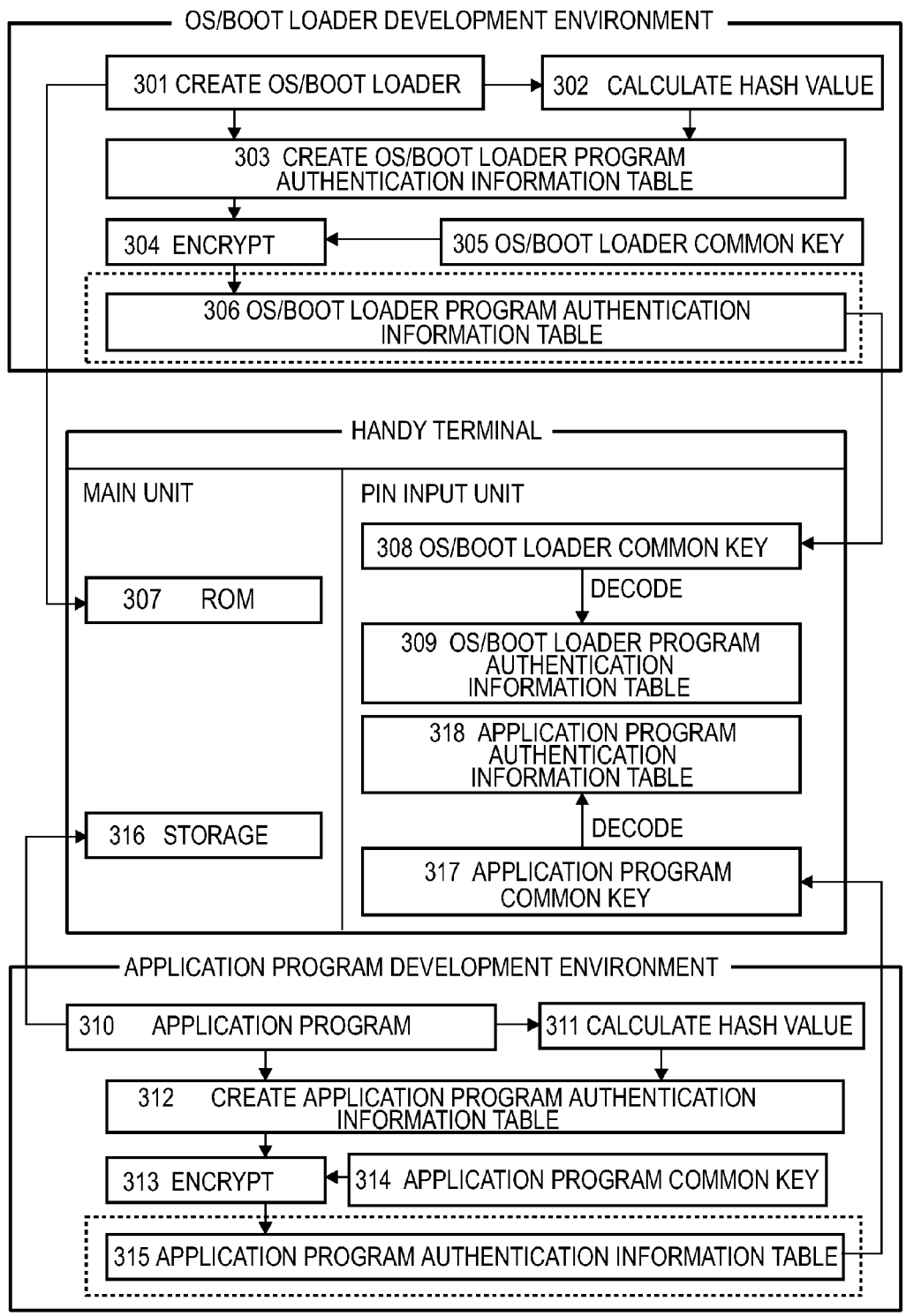
FIG. 3 A figure illustrates a view illustrating preparation for an install module and registration of an apparatus according to the embodiment of the present invention.

Preparation for a ROM to be mounted on an apparatus and registration of the apparatus will be described with reference to FIG. 3.

In program development environment, the boot loader and the OS to be executed on the apparatus are developed (301).

The ROM which stores the boot loader and the OS which are the execution programs is created, and a hash value based on the entire image data of the ROM is calculated (302). Meanwhile, the ROM has an EPROM (Erasable Programmable Read Only Memory), an EEPROM (Electrically Erasable Programmable Read Only Memory), a flash memory, a MRAM (Magnetic Random Access Memory) and a RAM (Random Access Memory) power of which is maintained by a battery. The ROM may be any recording medium as long as the ROM maintains the boot loader and the OS which are stored execution programs, and allows the programs to be read. In addition, instead of calculating a hash value based on entire image data of the ROM, a hash value based on entire image data of the boot loader and entire image data of the OS may be calculated.

A code of a character string which is "ROM" as a program ID is registered in an OS/boot loader program authentication information table together with the hash value based on the entire image data of the ROM.

To prevent the OS/boot loader program authentication information table from being falsified during process of registering the OS/boot loader program authentication information table in the PIN input unit, the OS/boot loader program authentication information table is encrypted using an OS/boot loader common key 305 (304).

An OS/boot loader common key 308 registered in the PIN input unit is an OS/boot loader common key in the OS/boot loader development environment, and is the same as the OS/boot loader common key utilized upon encryption of the OS/boot loader program authentication information table.

The encrypted OS/boot loader program authentication information table inputted from the OS/boot loader development environment by the PIN input unit is decoded (decrypted) using the OS/boot loader common key 308 stored in the PIN input unit, and the decoded OS/boot loader program authentication information table is registered in the PIN input unit (309).

Figure 4:
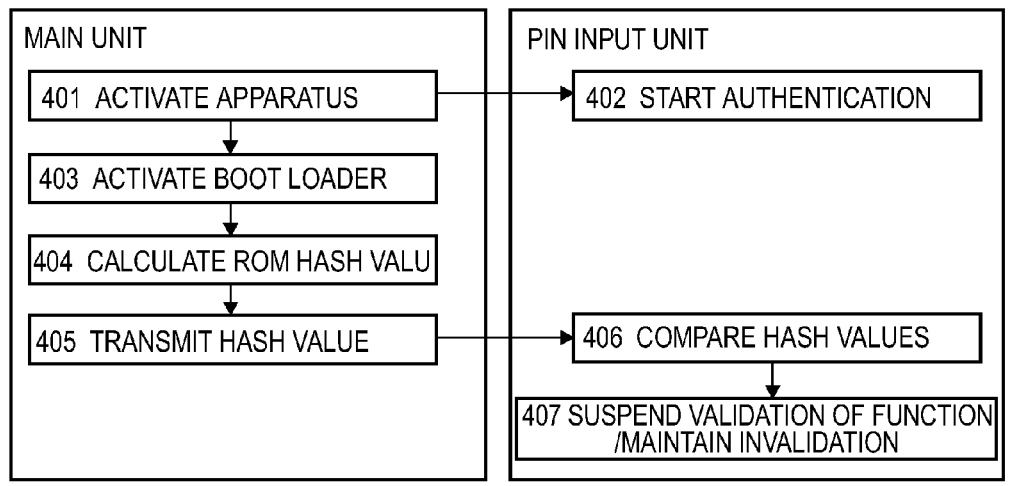
FIG. 4 A figure illustrates a view illustrating ROM authentication process according to the embodiment of the present invention.

Process of authenticating the ROM between the main unit and the PIN input unit will be described with reference to FIG. 4.

The main unit of the handy terminal is activated (401), and the PIN input unit is activated. Immediately after the PIN input unit is activated, the function of the PIN input unit is invalid. When the PIN input unit is activated, a ROM authenticating function of the PIN input unit is activated.

On the other hand, when the main unit is activated, the boot loader is first activated (403). The boot loader calculates a hash value of the ROM (404), and transmits the calculated hash value to the PIN input unit (405). In addition, upon above step 302, a hash value based on entire image data of the boot loader and entire image data of the OS may be calculated instead of calculating the hash value based on the entire image data of the ROM.

The PIN input unit compares the hash value received from the main unit and the hash value registered in the authentication information table held in the PIN input unit (406).

When both of the hash values are different, it is decided that the boot loader, the OS or both implemented in the main unit and stored in the ROM are unauthorized, the invalidated state of the function of the PIN input unit is maintained and processing is finished. In addition, with the present invention, maintaining the invalidated state is also referred to as "invalidating". Before processing is finished with the invalidated state of the function of the PIN input unit maintained, the PIN input unit may notify to the main unit that the boot loader, the OS or both stored in the ROM are unauthorized, and the main unit may display this notification.

Although, when both of hash values are the same as a result of comparison, it is decided that both of the boot loader and the OS implemented in the main unit and stored in the ROM are authorized, validating the function of the PIN input unit is suspended until it is decided that the application program is also authorized as a result of authentication of the application program described below.

Figure 5:
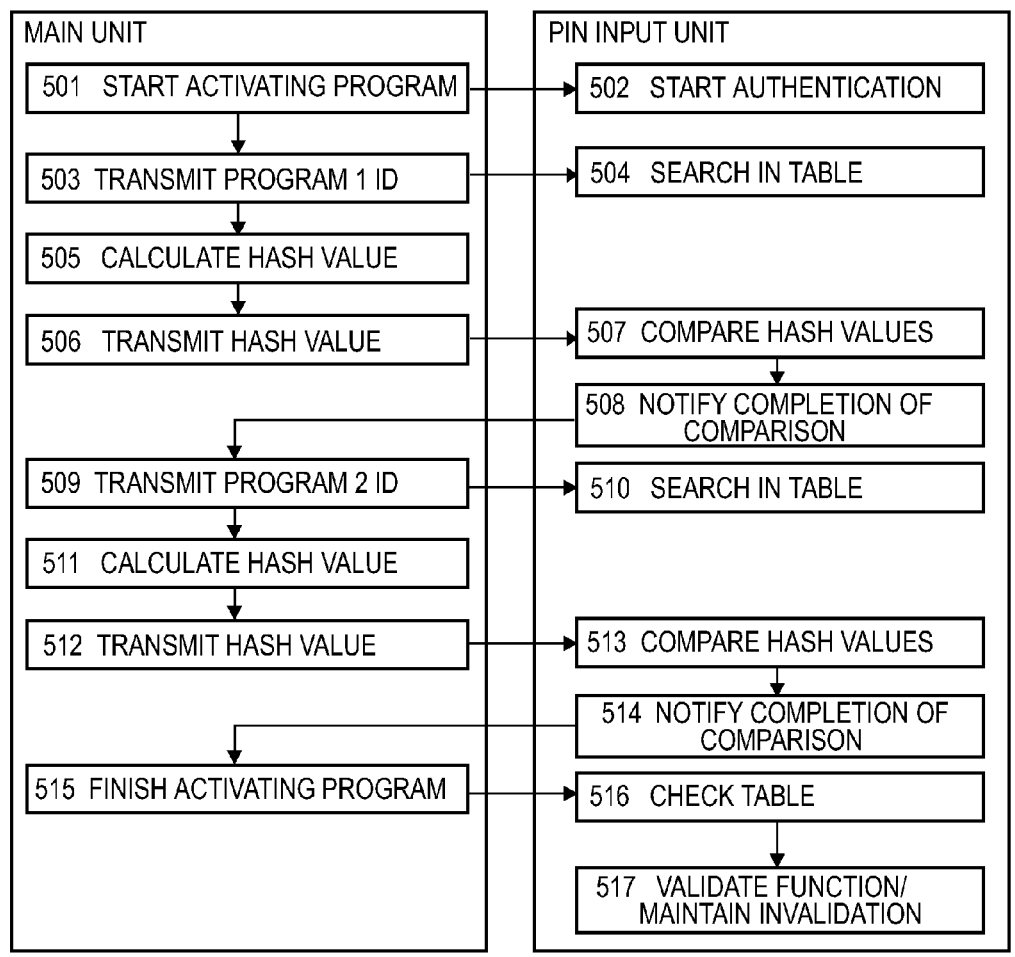
FIG. 5 A figure illustrates a view illustrating application program authentication process according to the embodiment of the present invention.

Next, a method of authenticating the application program implemented in the storage 101 of the main unit, which is performed after ROM authentication, will be described with reference to FIGS. 3 and 5. When it is decided that the boot loader, the OS or both stored in the ROM are unauthorized, authentication of the application program is not performed.

Preparation for the application program stored in the storage of the main unit and registration of the apparatus will be described with reference to FIG. 3.

In the application program development environment, an execution file of the application program to be executed on the main unit is created (310). By applying all items of image data of the execution file to the hash function, the hash value of the execution program is calculated. A file name of the execution program as a program ID is registered in the application program authentication information table together with the hash value (312). When there is a plurality of application programs, a hash value of an execution file of each application program is calculated, and a program ID and its hash value of each application program are registered in the application program authentication information table.

To prevent the application program authentication information table from being falsified during process of registering the application program authentication information table in the PIN input unit, the application program authentication information table is encrypted using the application program common key (313).

An application program common key 317 registered in the PIN input unit is the same as the application program common key 314 included in the application program development environment. The application program common keys are created by a handy terminal manufacturer, and are provided to developers of application programs. The handy terminal manufacturer registers the application program common key 317 in the PIN input unit upon manufacturing of the handy terminal.

The execution files of the application programs are stored in the storage 316 of the main unit. The encrypted application program authentication information table inputted from the application program development environment by the PIN input unit is decoded using the application program common key 317 registered in the PIN input unit, and is registered in the memory of the PIN input unit as an application program authentication information table 318.

Process in which the PIN input unit authenticates the application programs in the main unit will be described with reference to FIG. 5.

When start of activation of the application program is notified from the main unit to the PIN input unit (501), the PIN input unit starts authentication processing (502). An execution file name of a first application program to be executed on the main unit as an ID is notified from the main unit to the PIN input unit (503). The PIN input unit acquires a first program hash value from the application program authentication information table registered in the PIN input unit (504). On the other hand, the main unit calculates a first program hash value (505), and transmits this hash value to the PIN input unit. The PIN input unit compares the hash value received from the main unit and the hash value registered in the application program authentication information table (507).

When both of the hash values are different, it is decided that the execution file of the first application program implemented in the main unit is unauthorized, and the decision result is temporarily stored.

When both of the hash values are the same, it is decided that the execution file of the first application program implemented in the main unit is authorized, and the decision result is temporarily stored.

When two or more application programs are implemented in the main unit, the above method performed for the first application program is repeated for the rest of application programs.

Further, whether or not a hash value stored in the application program authentication information table of the PIN input unit and the hash value calculated by the main unit and transmitted to the PIN input unit match is decided for each application program of the rest of the application programs, and the decision result is temporarily stored.

When decision on the first application program and all the rest of application programs is finished, these decision results are studied. When a decision result of at least one application program indicates that an execution file of this application program is unauthorized, the function of the PIN input unit is kept invalidated. On the other hand, when the decision results of all application programs indicate that execution files of these application programs are authorized, the function of the PIN input unit is validated.

Hereinafter, subsequent operations when two application programs are implemented in the main unit will be described.

The PIN input unit notifies to the main unit that comparison for the first application program is completed (508).

An execution file name of a second application program to be executed on the main unit as an ID is notified from the main unit to the PIN input unit (509). The PIN input unit acquires a hash value of the second program from the application program authentication information table registered in the PIN input unit (510). On the other hand, the main unit calculates the hash value of the second program (511), and transmits this hash value to the PIN input unit (512). The PIN input unit compares the hash value received from the main unit and the hash value registered in the application program authentication information table (513).

The PIN input unit temporarily stores in the main unit a decision result as to the execution file of the second application program, and notifies to the main unit that comparison for the second application program is completed (514).

When activation of all application programs to be executed is already completed, the main unit notifies to the PIN input unit that activation of the application programs is finished (515).

When notified that activation is finished, the PIN input unit checks a hash value comparison result (516). When all programs registered in the authentication information table have the same value upon comparison of hash values (517), the function of the PIN input unit is validated.

When different values are detected upon comparison of hash values, the number of application programs the hash values of which are compared is less than the number of registered application programs or a program which is not registered is detected, it is decided that an error occurs and the function of the PIN input unit is invalidated. In addition, when a hash value of a program is acquired from the application program authentication information table registered in the PIN input unit, if a key program ID is not registered in the application program authentication information table, it is possible to detect a program which is not registered.

An effect according to the present embodiment includes preventing an unauthorized program from being executed by way of rewriting of a ROM and preventing a PIN code of a credit card from being stolen by authenticating the ROM in which the boot loader and the OS are stored when the PIN input unit is mounted in the main unit and by invalidating the function of the PIN input when the ROM is unauthorized. Further, the effect includes preventing an unauthorized execution file from being executed by way of rewriting of an execution file of an application program and preventing a PIN code of a credit card from being stolen by authenticating the execution file of the application program when the PIN input unit is mounted in the main unit and by invalidating the function of the PIN input unit when the execution file of the application program is unauthorized.

Consequently, the application programs and the PIN input program can share the keyboard and the display apparatus, so that it is possible to share a platform and effectively expand products. Further, it is possible to miniaturize the apparatus, simplify structure design of the apparatus, simplify process of manufacturing the apparatus, and reduce manufacturing cost.

Although a hash value is calculated per application program in the above embodiment, a hash value may be calculated for all application programs in the main unit.

The present invention is not limited to cases that the main unit of the handy terminal is used, and the present invention can be used even when any information processing apparatus is used instead of the main unit of the handy terminal.

Further, the present invention is not limited to cases that the PIN input unit is used, and the present invention is applicable even when any additional function unit is used instead of the PIN input unit.

Furthermore, the present invention is not limited to cases that a hash value is used, and the present invention is applicable even when any one-way function value is used instead of the hash value.

In addition, each component of the above system which validates/invalidates the additional function unit can be realized by hardware, software or a combination of these. Further, a method of validating/invalidating an additional function unit performed by the above system which validates/invalidates the additional function unit can also be realized by hardware, software or a combination of these. Meanwhile, that the system or the method is realized by software means that the system or the method is realized when a computer reads and executes a program.

Programs are stored using non-transitory computer readable media of various types, and can be supplied to the computer. The non-transitory computer readable media include tangible storage media of various types. Examples of the non-transitory computer readable media include magnetic recording media (such as a flexible disk, a magnetic tape and a hard disk drive), magnetooptical media (such as a magnetooptical disk), a CD-ROM (Read Only Memory), a CD-R, a CD-R/W, a semiconductor memory (such as a mask ROM, a PROM (Programmable ROM), an EPROM (Erasable PROM), a flash ROM and a RAM (random access memory)). Further, programs may be supplied to a computer through transitory computer readable media of various types. Examples of the transitory computer readable media include an electric signal, an optical signal and an electromagnetic wave. The transitory computer readable media can supply programs to a computer through wired communication channels such as wires or optical fibers or wireless communication channels.

Although part or entirety of the above embodiment can be described as in the following supplementary notes, part or entirety of the above embodiment is not limited to the below.
(Supplementary Note 1)

A method of validating/invalidating an additional function unit in an information processing apparatus to which the additional function unit is added, includes:
a step of calculating a first one-way function value based on data included in a recording medium that stores a boot loader and an operating system, and storing the first one-way function value in the additional function unit upon manufacturing;
a step of calculating a second one-way function value based on the data included in the recording medium after the information processing apparatus is activated; and
a step of, when the first one-way function value and the second one-way function value are different, invalidating a function of the additional function unit.
(Supplementary Note 2)

In the method of validating/invalidating the additional function unit described in Supplementary Note 1,
the second one-way function value is calculated by the information processing apparatus,
the second one-way function value is transmitted from the information processing apparatus to the additional function unit, and
the first one-way function value and the second one-way function value are compared by the additional function unit.
(Supplementary Note 3)

The method of validating/invalidating the additional function unit described in Supplementary Note 1, further includes:
a step of calculating per application program a third one-way function value based on data of an application program, and storing the third one-way function value in the additional function unit upon manufacturing;
a step of calculating per application program a fourth one-way function value based on the data of the application program after the information processing apparatus is activated; and
a step of, when the third one-way function value and the fourth one-way function value of at least part of application programs are different, invalidating the function of the additional function unit.
(Supplementary Note 4)

In the method of validating/invalidating the additional function unit described in Supplementary Note 3,
the fourth one-way function value is calculated by the information processing apparatus,
the fourth one-way function value is transmitted from the information processing apparatus to the additional function unit, and
the third one-way function value and the fourth one-way function value are compared by the additional function unit.
(Supplementary Note 5)

The method of validating/invalidating the additional function unit described in Supplementary Note 1, further includes:
a step of calculating a fifth one-way function value based on data of a plurality of application programs, and storing the fifth one-way function value in the additional function unit upon manufacturing;
a step of calculating a sixth one-way function value based on the data of the plurality of application programs after the information processing apparatus is activated; and
a step of, when the fifth one-way function value and the sixth one-way function value are different, invalidating the function of the additional function unit.
(Supplementary Note 6)

In the method of validating/invalidating the additional function unit described in Supplementary Note 5,
the sixth one-way function value is calculated by the information processing apparatus,
the sixth one-way function value is transmitted from the information processing apparatus to the additional function unit, and
the fifth one-way function value and the sixth one-way function value are compared by the additional function unit.
(Supplementary Note 7)

A system that validates/invalidates an additional function unit in an information processing apparatus to which the additional function unit is added, has:
a means that calculates a first one-way function value based on data included in a recording medium that stores a boot loader and an operating system, and stores the first one-way function value in the additional function unit upon manufacturing;
a means that calculates a second one-way function value based on the data included in the recording medium after the information processing apparatus is activated; and
a means that, when the first one-way function value and the second one-way function value are different, invalidates a function of the additional function unit.
(Supplementary Note 8)

In the system that validates/invalidates the additional function unit described in Supplementary Note 7,
the second one-way function value is calculated by the information processing apparatus, the second one-way function value is transmitted from the information processing apparatus to the additional function unit, and
the first one-way function value and the second one-way function value are compared by the additional function unit.

(Supplementary Note 9)

The system that validates/invalidates the additional function unit described in Supplementary Note 7, further has:
a means that calculates per application program a third one-way function value based on data of an application program, and stores the third one-way function value in the additional function unit upon manufacturing;
a means that calculates per application program a fourth one-way function value based on the data of the application program after the information processing apparatus is activated; and
a means that, when the third one-way function value and the fourth one-way function value of at least part of application programs are different, invalidates the function of the additional function unit.

(Supplementary Note 10)

In the system that validates/invalidates the additional function unit described in Supplementary Note 9,
the fourth one-way function value is calculated by the information processing apparatus,
the fourth one-way function value is transmitted from the information processing apparatus to the additional function unit, and
the third one-way function value and the fourth one-way function value are compared by the additional function unit.

(Supplementary Note 11)

The system that validates/invalidates the additional function unit described in Supplementary Note 7, further has:
a means that calculates a fifth one-way function value based on data of a plurality of application programs, and stores the fifth one-way function value in the additional function unit upon manufacturing;
a means that calculates a sixth one-way function value based on the data of the plurality of application programs after the information processing apparatus is activated; and
a means that, when the fifth one-way function value and the sixth one-way function value are different, invalidates the function of the additional function unit.

(Supplementary Note 12)

In the system that validates/invalidates the additional function unit described in Supplementary Note 11,
the sixth one-way function value is calculated by the information processing apparatus,
the sixth one-way function value is transmitted from the information processing apparatus to the additional function unit, and
the fifth one-way function value and the sixth one-way function value are compared by the additional function unit.

(Supplementary Note 13)

A program that causes a computer to function as a system that validates/invalidates an additional function unit in an information processing apparatus to which the additional function unit is added, causes the computer to function as:
a means that calculates a first one-way function value based on data included in a recording medium that stores a boot loader and an operating system, and stores the first one-way function value in the additional function unit upon manufacturing;
a means that calculates a second one-way function value based on the data included in the recording medium after the information processing apparatus is activated; and
a means that, when the first one-way function value and the second one-way function value are different, invalidates a function of the additional function unit.

(Supplementary Note 14)

The program described in Supplementary Note 13 further causes the computer to have:
the information processing apparatus calculate the second one-way function value;
the information processing apparatus transmit the second one-way function value to the additional function unit; and
the additional function unit compare the first one-way function value and the second one-way function value.

(Supplementary Note 15)

The program described in Supplementary Note 13 further causes the computer to function as:
a means that calculates per application program a third one-way function value based on data of an application program, and stores the third one-way function value in the additional function unit upon manufacturing;
a means that calculates per application program a fourth one-way function value based on the data of the application program after the information processing apparatus is activated; and
a means that, when the third one-way function value and the fourth one-way function value of at least part of application programs are different, invalidates the function of the additional function unit.

(Supplementary Note 16)

The program described in Supplementary Note 15 further causes the computer to have: the information processing apparatus calculate the fourth one-way function value;
the information processing apparatus transmit the fourth one-way function value to the additional function unit; and
the additional function unit compare the third one-way function value and the fourth one-way function value.

(Supplementary Note 17)

The program described in Supplementary Note 13 further causes the computer to function as:
a means that calculates a fifth one-way function value based on data of a plurality of application programs, and stores the fifth one-way function value in the additional function unit upon manufacturing;
a means that calculates a sixth one-way function value based on the data of the plurality of application programs after the information processing apparatus is activated; and
a means that, when the fifth one-way function value and the sixth one-way function value are different, invalidates the function of the additional function unit.

(Supplementary Note 18)

The program described in Supplementary Note 17 further causes the computer to have: the information processing apparatus calculate the sixth one-way function value;
the information processing apparatus transmit the sixth one-way function value to the additional function unit; and
the additional function unit compare the fifth one-way function value and the sixth one-way function value.

(Supplementary Note 19)

An additional function unit that is added to an information processing apparatus has:
a means that stores upon manufacturing a first one-way function value calculated based on data included in a recording medium that stores a boot loader and an operating system; and
a means that, when a second one-way function value calculated based on the data included in the recording medium after the information processing apparatus is activated, and the first one-way function value are different, invalidates a function of the additional function unit.

(Supplementary Note 20)

The additional function unit described in Supplementary Note 19 further has:

a means that stores per application program upon manufacturing a third one-way function value calculated based on data of an application program; and a means that, when a fourth one-way function value calculated per application program based on the data of the application program after the information processing apparatus is activated, and the third one-way function value are different, invalidates the function of the additional function unit.

(Supplementary Note 21)

The additional function unit described in Supplementary Note 19 further has:

a means that stores a fifth one-way function value calculated based on data of a plurality of application programs upon manufacturing; and a means that, when a sixth one-way function value calculated based on the data of the plurality of application programs after the information processing apparatus is activated, and the fifth one-way function value are different, invalidates the function of the additional function unit.

(Supplementary Note 22)

A program that causes a computer to function as an apparatus that validates/invalidates an additional function unit that is added to the information processing apparatus, causes the computer to function as:

a means that stores upon manufacturing a first one-way function value calculated based on data included in a recording medium that stores a boot loader and an operating system; and a means that, when a second one-way function value calculated based on the data included in the recording medium after the information processing apparatus is activated, and the first one-way function value are different, invalidates a function of the additional function unit.

(Supplementary Note 23)

The program described in Supplementary Note 22 further causes the computer to function as:

a means that stores per application program upon manufacturing a third one-way function value calculated based on data of an application program; and a means that, when a fourth one-way function value calculated per application program based on the data of the application program after the information processing apparatus is activated, and the third one-way function value are different, invalidates the function of the additional function unit.

(Supplementary Note 24)

The program described in Supplementary Note 22 further causes the computer to function as:

a means that stores upon manufacturing a fifth one-way function value calculated based on data of a plurality of application programs; and a means that, when a sixth one-way function value calculated based on the data of the plurality of application programs after the information processing apparatus is activated, and the fifth one-way function value are different, invalidates the function of the additional function unit.

This application is based on Japanese Patent Application No. 2011-030746 (filed on Feb. 16, 2011), and claims priority under the Paris Convention based on Japanese Patent Application No. 2011-030746. The disclosure of Japanese Patent Application No. 2011-030746 is incorporated in this description with reference to Japanese Patent Application No. 2011-030746.

Although a typical embodiment of the present invention has been described in details, it should be understood that various changes, substitutions and alternatives can be made without departing from a spirit and a scope of the present invention defined by the claims. Further, if the claims are amended upon filing of an application, the inventors intend that a uniform scope of the claimed invention is maintained.

REFERENCE SINGS LIST

101 STORAGE
102 ROM
103 RAM
104 CENTRAL CONTROL UNIT
105 DISPLAY UNIT
106 SUB CPU
107 PROGRAM STORAGE MEMORY
108 DATA STORAGE MEMORY
109 KEYBOARD
110 IC CARD UNIT

What is claimed is:

1. A method of validating/invalidating an additional function unit in an information processing apparatus to which the additional function unit is added, the method comprising:

a step of calculating a first one-way function value based on data included in a recording medium that stores a boot loader and an operating system, and storing the first one-way function value in the additional function unit upon manufacturing;

a step of calculating a second one-way function value based on the data included in the recording medium after the information processing apparatus is activated; and a step of, when the first one-way function value and the second one-way function value are different, invalidating a function of the additional function unit, wherein the recording medium is provided in the information processing apparatus, the additional function unit is a unit that is added to the information processing apparatus, the information processing apparatus is a payment function mounted handy terminal, and the additional function unit is a PIN (Personal Identification Number) input unit.

2. The method of validating/invalidating the additional function unit according to claim 1, wherein:

the second one-way function value is calculated by the information processing apparatus;

the second one-way function value is transmitted from the information processing apparatus to the additional function unit; and the first one-way function value and the second one-way function value are compared by the additional function unit.

3. The method of validating/invalidating the additional function unit according to claim 1, further comprising:

a step of calculating per application program a third one-way function value based on data of an application program, and storing the third one-way function value in the additional function unit upon manufacturing;

a step of calculating per application program a fourth one-way function value based on the data of the application program after the information processing apparatus is activated; and a step of, when the third one-way function value and the fourth one-way function value of at least part of application programs are different, invalidating the function of the additional function unit.

4. The method of validating/invalidating the additional function unit according to claim 3, wherein:

the fourth one-way function value is calculated by the information processing apparatus;

the fourth one-way function value is transmitted from the information processing apparatus to the additional function unit; and the third one-way function value and the fourth one-way function value are compared by the additional function unit.

5. The method of validating/invalidating the additional function unit according to claim 1, further comprising:

a step of calculating a fifth one-way function value based on data of a plurality of application programs, and storing the fifth one-way function value in the additional function unit upon manufacturing;

a step of calculating a sixth one-way function value based on the data of the plurality of application programs after the information processing apparatus is activated; and a step of, when the fifth one-way function value and the sixth one-way function value are different, invalidating the function of the additional function unit.

6. The method of validating/invalidating the additional function unit according to claim 5, wherein:

the sixth one-way function value is calculated by the information processing apparatus;

the sixth one-way function value is transmitted from the information processing apparatus to the additional function unit; and the fifth one-way function value and the sixth one-way function value are compared by the additional function unit.

7. A system that validates/invalidates an additional function unit in an information processing apparatus to which the additional function unit is added, the system comprising:

a unit configured to calculate a first one-way function value based on data included in a recording medium that stores a boot loader and an operating system, and to store the first one-way function value in the additional function unit upon manufacturing;

a unit configured to calculate a second one-way function value based on the data included in the recording medium after the information processing apparatus is activated; and a unit configured to invalidate a function of the additional function unit when the first one-way function value and the second one-way function value are different, wherein the recording medium is provided in the information processing apparatus, the additional function unit is a unit that is added to the information processing apparatus, the information processing apparatus is a payment function mounted handy terminal, and the additional function unit is a PIN (Personal Identification Number) input unit.

8. The system that validates/invalidates the additional function unit according to claim 7, wherein:

the second one-way function value is calculated by the information processing apparatus;

the second one-way function value is transmitted from the information processing apparatus to the additional function unit; and the first one-way function value and the second one-way function value are compared by the additional function unit.

9. The system that validates/invalidates the additional function unit according to claim 7, further comprising:

a unit configured to calculate per application program a third one-way function value based on data of an application program, and to store the third one-way function value in the additional function unit upon manufacturing;

a unit configured to calculate per application program a fourth one-way function value based on the data of the application program after the information processing apparatus is activated; and a unit configured to invalidate the function of the additional function unit when the third one-way function value and the fourth one-way function value of at least part of application programs are different.

10. The system that validates/invalidates the additional function unit according to claim 9, wherein:

the fourth one-way function value is calculated by the information processing apparatus;

the fourth one-way function value is transmitted from the information processing apparatus to the additional function unit; and the third one-way function value and the fourth one-way function value are compared by the additional function unit.

11. The system that validates/invalidates the additional function unit according to claim 7, further comprising:

a unit configured to calculate a fifth one-way function value based on data of a plurality of application programs, and to store the fifth one-way function value in the additional function unit upon manufacturing;

a unit configured to calculate a sixth one-way function value based on the data of the plurality of application programs after the information processing apparatus is activated; and a unit configured to invalidate the function of the additional function unit when the fifth one-way function value and the sixth one-way function value are different.

12. The system that validates/invalidates the additional function unit according to claim 11, wherein:

the sixth one-way function value is calculated by the information processing apparatus;

the sixth one-way function value is transmitted from the information processing apparatus to the additional function unit; and the fifth one-way function value and the sixth one-way function value are compared by the additional function unit.

13. A non-transitory recording medium storing a program that causes a computer to function as a system that validates/invalidates an additional function unit in an information processing apparatus to which the additional function unit is added, the program causing the computer to function as:

a unit configured to calculate a first one-way function value based on data included in a recording medium that stores a boot loader and an operating system, and to store the first one-way function value in the additional function unit upon manufacturing;

a unit configured to calculate a second one-way function value based on the data included in the recording medium after the information processing apparatus is activated; and a unit configured to invalidate a function of the additional function unit when the first one-way function value and the second one-way function value are different, wherein the recording medium is provided in the information processing apparatus, the additional function unit is a unit that is added to the information processing apparatus, the information processing apparatus is a payment function mounted handy terminal, and the additional function unit is a PIN (Personal Identification Number) input unit.

14. The non-transitory recording medium storing the program according to claim 13, the program causing the computer to have:
   the information processing apparatus calculate the second one-way function value;
   the information processing apparatus transmit the second one-way function value to the additional function unit; and
   the additional function unit compare the first one-way function value and the second one-way function value.

15. The non-transitory recording medium storing the program according to claim 13, them further causing the computer to function as:
   a unit configured to calculate per application program a third one-way function value based on data of an application program, and to store the third one-way function value in the additional function unit upon manufacturing;
   a unit configured to calculate per application program a fourth one-way function value based on the data of the application program after the information processing apparatus is activated; and
   a unit configured to invalidate the function of the additional function unit when the third one-way function value and the fourth one-way function value of at least part of application programs are different.

16. The non-transitory recording medium storing the program according to claim 15, them further causing the computer to have:
   the information processing apparatus calculate the fourth one-way function value;
   the information processing apparatus transmit the fourth one-way function value to the additional function unit; and
   the additional function unit compare the third one-way function value and the fourth one-way function value.

17. The non-transitory recording medium storing the program according to claim 13, them further causing the computer to function as:
   a unit configured to calculate a fifth one-way function value based on data of a plurality of application programs, and to store the fifth one-way function value in the additional function unit upon manufacturing;
   a unit configured to calculate a sixth one-way function value based on the data of the plurality of application programs after the information processing apparatus is activated; and
   a unit configured to invalidate the function of the additional function unit when the fifth one-way function value and the sixth one-way function value are different.

18. The non-transitory recording medium storing the program according to claim 17, them further causing the computer to have:
   the information processing apparatus calculate the sixth one-way function value;
   the information processing apparatus transmit the sixth one-way function value to the additional function unit; and
   the additional function unit compare the fifth one-way function value and the sixth one-way function value.

19. An additional function unit that is added to an information processing apparatus, the additional function unit comprising:
   a unit configured to store upon manufacturing a first one-way function value calculated based on data included in a recording medium that stores a boot loader and an operating system; and
   a unit configured to invalidate a function of the additional function unit, when a second one-way function value calculated based on the data included in the recording medium after the information processing apparatus is activated, and the first one-way function value are different,
   wherein the recording medium is provided in the information processing apparatus,
   the additional function unit is a unit that is added to the information processing apparatus,
   the information processing apparatus is a payment function mounted handy terminal, and
   the additional function unit is a PIN (Personal Identification Number) input unit.

20. A non-transitory recording medium storing a program that causes a computer to function as an apparatus that validates/invalidates an additional function unit that is added to the information processing apparatus, the program causing the computer to function as:
   a unit configured to store upon manufacturing a first one-way function value calculated based on data included in a recording medium that stores a boot loader and an operating system; and
   a unit configured to invalidate a function of the additional function unit when a second one-way function value calculated based on the data included in the recording medium after the information processing apparatus is activated, and the first one-way function value are different,
   wherein the recording medium is provided in the information processing apparatus,
   the additional function unit is a unit that is added to the information processing apparatus,
   the information processing apparatus is a payment function mounted handy terminal, and
   the additional function unit is a PIN (Personal Identification Number) input unit.

* * * * *